June 16, 1953     M. R. HUTCHISON, JR     2,642,169
COMBINED ELECTROMAGNETICALLY ACTUATED CLUTCH AND BRAKE
Filed Dec. 28, 1950

MILLER R. HUTCHISON, JR.
Inventor

By Daniel I. Mayne

Attorneys

Patented June 16, 1953

2,642,169

UNITED STATES PATENT OFFICE 2,642,169

COMBINED ELECTROMAGNETICALLY ACTUATED CLUTCH AND BRAKE

Miller R. Hutchison, Jr., Rochester, N. Y., assignor to Eastman Kodak Company, Rochester, N. Y., a corporation of New Jersey Application December 28, 1950, Serial No. 203,190

6 Claims. (Cl. 192—18)

The present invention relates to a combined electromagnetically actuated friction clutch and brake for a tape-feeding member, and particularly one designed for rapid application of the drive and/or braking action to the driven member.

Combined electromagnetically actuated friction clutches and brakes are a common part of machines employing electronic control of power transmission. Such machines include film and tape readers, or projectors, of the photocell type, and in which the film is fed until a photocell "sees" a signal mark on the film, at which instant the photocell sets up a signal which causes the application of a brake to the film-feeding mechanism in order to stop the film in a given position. Disparity in the operating speeds of electronic and mechanical components of such equipment has focused attention upon clutch and brake improvements, of which the present invention is an example.

The principal object of the present invention is to provide a combined electromagnetically actuated clutch and brake which has a very high speed of application. This is accomplished by reducing clutch or brake movements to a minimum and by employing a very small magnetic air gap which increases the mean effective tractive force available from a given electronic power supply.

Another object of the invention is to provide a combined electromagnetically actuated friction clutch and brake which is designed to provide self-alignment of the parts thereof, automatic compensation for wear, and ready adjustment of the magnetic air gaps while the device is operating or is stationary.

And, another object is to provide a combined clutch and brake of the type described which is particularly suited to a transport system for a film or tape and comprising a relatively small number of different parts and those of simple form and ready manufacturability.

Figure 1:
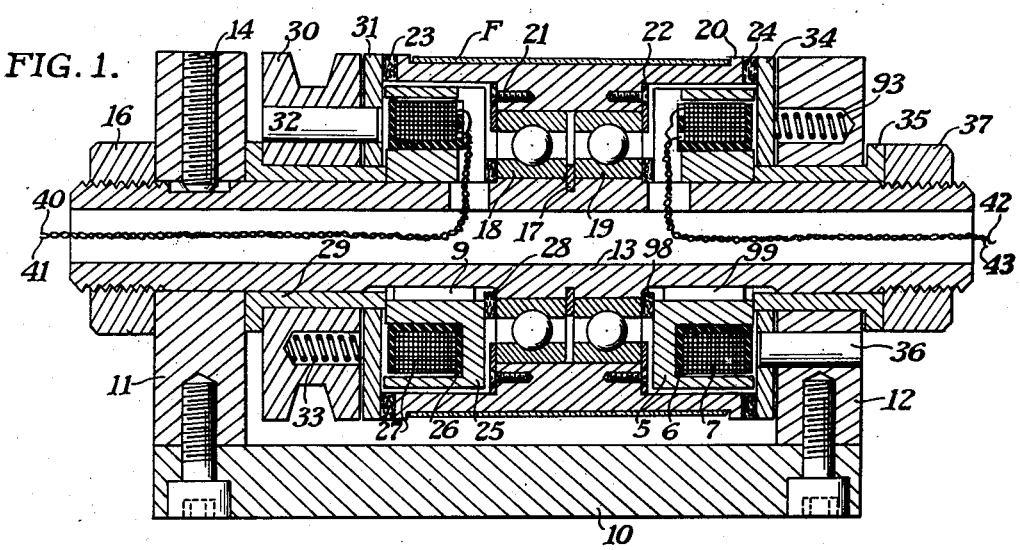
Figure 2:
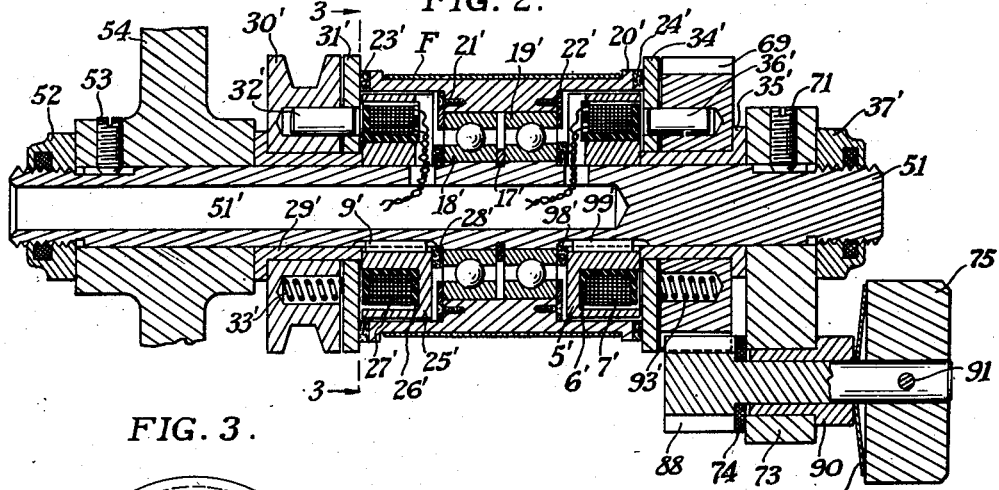
Figure 3:
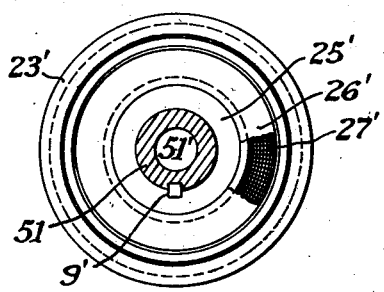

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawings, in which:

Fig. 1 is a horizontal sectional view of a combined electromagnetically actuated friction clutch and brake associated with a film or tape-feeding member and constructed in accordance with one embodiment of the present invention;

Fig. 2 is a horizontal section showing another embodiment of the clutch and brake and differing from the form shown in Fig. 1 in the cantilever mounting of the spindle and the provision of means for manually rotating the film-feeding member and allowing manual displacement of the film subsequent to its being brought to rest by the brake; and Fig. 3 is a sectional view taken substantially on line 3—3 of Fig. 2.

Like reference characters refer to corresponding parts throughout the drawing.

Film and/or tape readers of the photocell type are well known and essentially comprise means for feeding a film or tape past a viewing or projection station until a photocell scanning the film detects a given code on the film and gives a signal to stop the film feed with the selected portion of the film at the viewing or projecting station. Then, after the information on the film is made use of, the film feed is again started for further scanning. In readers of this type, the film is generally fed by a rubber-covered driving roller with which it is held in wrapped relation, although a sprocket may be used if the film or tape is perforated along its edge. The driving roller is usually connected with a source of power by a combined electromagnetically actuated clutch and brake, selective energization of which will either connect the roller to the driver means or put the brake on it to stop the film the instant the photocell detects a given code on the film. In devices of this type it is imperative that the speed of response of the clutch and brake be comparable to that of the electronic components giving the signal to start and stop the film if the film is to be stopped in a given position without overtraveling that position, and if it is to come up to a speed in a reasonably fast time from a stopped condition. To this end I have invented a new combined electromagnetically actuated friction clutch and brake for a film or tape-feeding member which is more rapid in response than any similar device heretofore available, and which combined clutch and brake has other novel features which make it particularly useful in the application mentioned.

Referring now to the embodiment of my invention shown in Fig. 1, a base 10 and end plates 11 and 12, which may form a part of the reader frame, constitute a support for a hollow spindle 13. A set screw 14 in one end plate has a flat point and bears lightly against a flat on the spindle to prevent rotation while permitting endwise movement. A nut 16 is threaded on one end of the spindle to position it with respect to the end plate 11. A locking ring 17 in a groove in the spindle provides a shoulder locating opposed ball bearings 18 and 19 which are slidably mounted on the spindle. A film or tape-feeding drum 20 is journaled by the ball bearings to which it is secured by screws 21 and clamping rings 22, preventing its endwise movement with respect to the spindle. The film or tape-feeding drum shown is adapted to have the film or tape "F" held in wrapped relation therewith and preferably has a rubber surface to provide a suitable frictional engagement between the film and itself. It will be understood that this drum could also be a sprocket in the event the film or tape to be handled was perforated. The important thing is that the drum is open-ended and provided with a centrally located mounting hub so that the mass of the member is reduced to a minimum, and so that the electromagnets can be located within the ends of the drum for a compact arrangement of parts, as will be hereinafter fully described.

Friction facings 23 and 24 are cemented to the drum ends. A clutch-actuating electromagnet comprising an annular core 25, an insulating bobbin 26, and a winding 27 of enameled copper wire is slidably mounted on the spindle by a spline connection 9. A resilient spacer 28 separates the core from the adjacent fixed ball bearing. A bearing bushing 29, slidable on the spindle, separates the core 25 from the end plate 11 and serves externally as a journal for a driving pulley 30 and a clutch or driving armature 31. This pulley 30 is adapted to be continuously driven by a belt from a source of power not shown. One or more driving pins 32 seated in the pulley 30 engage holes in the armature to transmit torque, and to allow the armature to move axially of the spindle relative to the pulley without disrupting the driving connection between the two. The armature is seated lightly upon the friction facing 23 of the drum by springs 33 housed in the pulley and, as a result of which, there is a nominal driving torque being applied to the drum at all times. The purpose of springs 33 is to normally hold the armature in physical contact with the friction facing on the drum at times when the driving magnet 25—26—27 is not energized, and the same result could be obtained in other ways; i. e., such as, maintaining a small amount of energization in the core 25 of the magnet at all times.

At the opposite end of the drum 20 a brake armature 34 is seated lightly on the friction facing 24 by springs 93 housed in the end plate 12 and, as a result of which, there is a nominal braking torque applied to the drum at all times to overcome the nominal driving torque applied to the drum by the clutch and thus hold the drum stationary when said clutch is not energized. A bushing 35 journals the armature 34 and is slidably supported by the end plate. Brake pins 36 seated in end plate 12 engage holes in the armature to prevent its rotation while permitting it to move axially of the spindle. A brake electromagnet comprising an annular core 5 and insulating bobbin 6 and a winding 7 of insulated copper wire is mounted on the spindle by a spline connection 99 and is positioned endwise by a resilient spacer 98 and the bushing 35. A nut 37 is threaded onto the spindle to clamp these parts against the ball bearing 19 and the lock ring 17 which engage the spindle.

A novel feature of this combined clutch and brake is that the length of the air gaps of the clutch and brake can be adjusted while the apparatus is either running or stationary, and neither adjustment has an effect upon the other. Adjustment of the length of the magnetic air gap of the clutch is made with the nut 16. Tightening the nut draws the spindle and drum assembly toward end plate 11 by compressing the resilient spacer 28. The drum, in turn, carries with it the clutch or driving armature 31 while the clutch electromagnet remains stationary. A result is increased magnetic air gap. The reverse is also true as the nut 16 is backed off. The spindle may be locked in any position of adjustment by tightening the set screw 15.

Adjustment of the length of the magnetic air gap of the brake is made with the nut 37. Tightening the nut displaces the bushing 35 and the brake electromagnet toward the left through compression of the resilient spacer 98. Since the drum assembly and brake armature 34 remain longitudinally motionless, this increases the magnetic air gap. The reverse is also true.

In operation, film or tape "F" to be transported is frictionally engaged by the drum about which it is held in wrapped relation. The clutch pulley 30 is driven at a constant speed by a motor through a V belt, not shown. The clutch is energized by an external source of electric power applied to the coil 27 of the clutch electromagnet through leads 40 and 41 extending through the interior of the spindle and being mechanically attached to the terminals of the coil 27 in any suitable manner. Energization of the clutch electromagnet generates a magnetic flux which attracts the clutch armature to the core 25 of the magnet. The force of this attraction is supported by the drum which is already in physical contact with the clutch armature 31 by virtue of action of springs 33, and this added frictional force between the clutch armature and the drum overcomes the nominal braking torque applied to the drum by the spring-pressed brake armature in order to set the drum in motion. The time and energy required to effect this are reduced to a minimum by the small magnetic air gap used and by the practical elimination of armature movement resulting from my novel arrangement of parts. The operation of the brake is similar, the winding 7 thereof being energized through leads 42 and 43 extending through the interior of the other end of the spindle and being mechanically attached to the terminals of the winding. Only one of the electromagnets is energized at any given time by the external control circuit, not shown, so that the clutch and brake never work against one another except for the nominal driving and braking torques which are applied at all times due to the action of springs 33 and 93 acting at all times on the clutch armature 31 and brake armature 34, respectively, to hold each of them lightly in physical contact with the ends of the drum with such relative frictional forces that the brake will keep the drum stationary when both electromagnets are deenergized.

Referring now to Fig. 2, I will describe another embodiment of my combined clutch and brake which permits the same to be mounted on the machine, of which it is to form a part, in a cantilever fashion, and permits manual adjustment of the film-feeding drum for any reason; i. e., framing the film relative to a projection or viewing gate, or station. Since certain parts of this embodiment are identical, both in operation and form, with parts of the first disclosed embodiments, such parts in this second embodiment will be referred to by the same reference numerals as the corresponding parts in the first embodiment with the addition of a prime (') designation.

In this embodiment, the mechanism is supported in cantilever fashion by a supporting web 54 forming part of the chassis of an electronic film reader, or other piece of equipment using a film or tape drive of the type in question. The spindle 51 is slidably mounted in the web 54. A set screw 53 with a flat point engages a flat on the spindle to prevent its rotation while permitting endwise movement. In this instance, the spindle 51, instead of being hollow throughout its length as before, is provided with a bore 51' for the leads to the electromagnets which extends only from the supported end of the spindle to a point permitting the leads for the brake magnet to pass out into the open end of the drum containing said magnet. A nut 52 is threaded on one end of the spindle to position it endwise relative to the web 54. A lock ring 17' in a groove in the spindle provides a shoulder locating opposed ball bearings 18' and 19' slidably mounted on the spindle. A film or tape-feeding drum 20' is journaled by the ball bearings to which it is secured by screws 21' clamping rings 22' preventing its endwise movement with respect to the spindle. Friction facings 23' and 24' are cemented to the drum ends. A clutch-engaging electromagnet comprising an annular core 25' and insulating bobbin 26' and a winding 27' of insulated wire is mounted on the spindle within one end of the drum assembly by a spline connection 9' which permits the spindle to move axially relative thereto. A resilient spacer 28' separates the core 25' from the adjacent fixed ball bearing 18'. A bearing bushing 29' slidable on the spindle separates the core 25' from the web 54 and serves externally as a journal for a driving pulley 30' and a clutch or driving armature 31'. One or more driving pins 32' seated in the pulley engage holes in the armature to transmit torque. The armature is seated lightly upon the friction facing 23' of the drum by springs 33' housed in the pulley.

At the opposite end of the drum 20' a brake armature 34' is seated lightly on the friction facing 24' by springs 93' housed in the brake positioning gear 69. A bushing 35' serves as a journal for the armature and gear 69, and is slidable on the spindle. Brake pins 36' seated in the gear engage holes in the brake armature to prevent its rotation while permitting it to move axially of the spindle. A brake electromagnet comprising an annular core 5' and insulating bobbin 6' and a winding 7' is slidably mounted on the spindle by a spline connection 99' and is positioned endwise by a resilient spacer 98' and the bushing 35'. The gear engages a pinion 88 which is journaled in a bushing 90 held by an arm 73 carried by the spindle. Rotation of the arm is prevented by a set screw 71 with a flat point which rests on a flat on the spindle. Rotation of the pinion is frictionally arrested by a friction washer 74 which is tensioned by a spring washer 76 compressed between the knob 75 and the bushing 90. The brake positioning gear and armature may be rotated manually by turning the knob 75 which is fastened to the pinion shaft by a pin 91. A nut 37' is threaded onto the spindle to clamp the arm, bushing, core, spacer, and ball bearing against the lock ring which engages the spindle.

Adjustment of the length of the magnetic air gap of the clutch is made as in the embodiment shown in Fig. 1 and previously described.

Adjustment of the length of the magnetic air gap of the brake is made with the nut 37'. Tightening the nut displaces the arm, bushing, and core to the left by compressing the resilient spacer 98', while the brake armature, resting against the drum facing, remains longitudinally stationary. The result is an increased magnetic air gap. The reverse is also true. Set screw 71 may be tightened to lock the parts in an adjusted position. Both adjustments may, as before, be made while the apparatus is either running or stationary and the adjustment of one does not affect the adjustment of the other.

In operation, film "F" to be transported is frictionally engaged by the drum about which it wraps. The clutch and brake are separately energized in the fashion described for the embodiment of Fig. 1. In addition, this last embodiment allows manual displacement of the film or tape subseqent to its being brought to rest by the brake. To this end, brake application is maintained while the knob 75 is turned by hand to rotate the drum through the pinion and gear of the brake backing mechanism.

The operational advantages of this new combined clutch and brake design over known devices of this same general type will be more readily appreciated if the factors affecting the performance in electromagnetically actuated clutches in general are considered. There are three principal divisions of activity upon which the rate of performance of such devices depend, and these are (1) build-up of flux; (2) linear displacement of armature, and (3) angular acceleration of load.

By reducing the mechanical and magnetic air gaps in this combined clutch and brake to a minimum, I have obtained a significant saving in both power and time consumption. Using separate electromagnets and armatures for the clutch and brake instead of two magnets and one armature, as is conventional practice, it has been possible to arrange each armature relative to its own magnet so that the mechanical and magnetic air gaps are small when the clutch or brake is deenergized and is reduced to a minimum when the clutch or brake is energized.

Linear displacement of the armature in an axial direction has been eliminated for all practical considerations because the armatures are in physical contact with the ends of the drum under a spring load, even when the magnets are deenergized and, as a result of which, the extent of axial movement of the armatures is that necessary only to increase the pressure between the armatures and the drum facings to give the necessary driving or braking torques. Axial movement of the armature is incidental only to such misalignment of parts as cannot be overcome in manufacturing, or which may arise from uneven wear of braking surfaces.

Angular acceleration of load is increased by reduction of the mass or inertia of the moving parts of the device. By using a film or tape-driving member which takes the form of a hollow drum and is directly associated with the clutch and brake mechanism, the rotative inertia of the device is kept at a minimum. As is customary in most film or tape-moving devices of this nature, the film-driving member is not remote from the clutch and brake so as to necessitate added shafting which would add to the inertia load. Furthermore, the particular arrangement of parts in this combined clutch and brake provides a very compact device. With this arrangement of parts made of steel, I have found the time required to start or stop the film is 0.3 millisecond, as compared to 3 milliseconds with known electromagnetically clutch and brake assemblies operating on the same principle and used in the same capacity.

Another important feature of the present invention concerns the adjustability of the air gaps of the magnets, since the ability to readily adjust the air gaps during operation is essential to maintenance of most rapid response. In this device, very small air gaps, not exceeding .002-inch, are being dealt with and which it would be extremely difficult and expensive to produce and maintain in an assembly of so many parts without this adjustable feature.

In addition to those novel features above mentioned, the present design of combined clutch and brake lends itself to ready and inexpensive production. This is brought about by the interchangeability of parts used which reduces the original tool cost for the mechanism. In this respect it will be noted that the two electromagnets, the two armatures, the brake and driving pins, and the resilient spacers are duplicates. Also, the elimination of slip rings simplifies the structure and its maintenance at the expense of a small energy loss due to eddy current losses on the driving side of the clutch when the film is driven by a belt.

While I have shown and described certain specific embodiments of my invention, I am aware that certain modifications thereof are possible. My invention therefore is not to be restricted to the precise details of construction shown and described by way of illustration, but is intended to cover all modifications coming within the scope of the appended claims.

Having thus described my invention, what I claim is new and desire to secure by Letters Patent of the United States is:

1. A combined electromagnetic friction clutch and brake for a tape-feeding member comprising in combination a stationary hollow spindle; a tape-feeding member in the form of an open-ended drum rotatably mounted on said spindle intermediate its ends; a friction facing on each end of said drum, a driving armature rotatably mounted on said spindle at one end of said drum and movable axially of the spindle; means normally moving said armature facewise into physical contact with the friction facing on one end of said drum with a nominal pressure to produce an initial driving torque on said drum but which is insufficient to normally drive the same; a first electromagnet fixedly mounted on said spindle coaxially with and within the open end of said drum engaged by said driving armature and disposed with the effective face of its core spaced slightly axially of the spindle from the plane occupied by the face of the armature and said friction facing to provide a small air gap between the armature and core of the magnet which will be bridged by a magnetic flux upon energization of the magnet to pull the armature toward said friction facing and increase the driving torque on said drum to drive it; a braking armature mounted on the other end of said spindle to move axially thereof but not rotate; means normally moving said braking armature axially of said spindle and into facewise physical contact with the friction facing on the other end of said drum with a nominal pressure to produce a braking torque sufficient to overcome said initial driving torque of said driving armature but insufficient to overcome its driving torque when its magnet is energized, a second electromagnet coaxially and fixedly mounted on said spindle within the other end of said drum and disposed with its effective core face spaced slightly axially of said spindle from the plane occupied by the face of the braking armature and the friction facing engaged thereby to provide a small air gap between the armature and core of the magnet which will be bridged by a magnetic flux upon energization of the magnet to pull the armature into contact with the friction facing with greater pressure and increase the braking torque on said drum to stop it; and electrical leads extending through said hollow spindle and mechanically attached to the terminals of the coils of said magnets, whereby power can be fed to said magnets to energize the same in alternate relation for rapidly stopping and starting said drum as desired.

2. A combined electromagnetic friction clutch and brake for a tape-feeding member comprising in combination a stationary spindle, a ball bearing having its inner raceway fixed to said spindle intermediate its ends, a tape-feeding member in the form of a cylindrical sleeve fixed intermediate its ends to the outer raceway of said ball bearing in coaxial relation with said spindle, a friction facing on each end of said sleeve, a driving member rotatably mounted on said spindle in spaced relation with one end of said sleeve, a driving armature rotatably and slidably mounted in coaxial relation on said spindle between said driving member and the end of said sleeve, means connecting said armature to said driving member whereby the armature may move axially of said spindle relative to said driving member while being rotatively connected thereto, means normally moving the face of said armature into physical contact with the end of said sleeve with a light pressure to produce a constant nominal driving torque on the sleeve, a first annular electromagnet coaxially fixed on said spindle within one end of said sleeve with the face of its core slightly offset relative to the exposed surface of said friction facing to provide an air gap between the core and armature which decreases as the magnet is energized and pulls the armature into firmer contact with said friction facing to produce a desired driving torque, a brake armature coaxially disposed on said spindle adjacent the other end of said sleeve to move axially but not rotatively relative thereto, means normally moving the face of said brake armature into physical contact with the friction facing on the other end of said sleeve to produce a nominal braking action on said sleeve sufficient to overcome said nominal driving torque applied to said sleeve, a second annular electromagnet coaxially disposed on said spindle within the other end of said sleeve and with the face of its core offset slightly from the plane of the outer surface of the friction facing to provide an air gap between the same and the braking armature which is decreased when said second electromagnet is energized to pull the braking armature into firmer contact with the friction facing on the end of the sleeve to bring said sleeve to a stop when said first electromagnet is deenergized and after which said nominal braking action applied to said sleeve will hold the sleeve stationary against the action of the nominal driving torque normally applied thereto when both electromagnets are deenergized.

3. A combined electromagnet friction clutch and brake for a tape-feeding member comprising in combination a fixed support; a spindle mounted on said support for limited axial adjustment but held against rotation; means for releasably locking said spindle against axial movement; a ball bearing fixed to said spindle intermediate its ends; a tape-feeding member in the form of an open-ended drum fixed intermediate its ends to the outer raceway of said ball bearing in coaxial relation with said spindle; a friction facing fastened to both ends of said drum; a first annular electromagnet splined to said spindle in coaxial relation therewith and within one end of said drum so that the effective face of its core is displaced by a slight amount axially of said spindle from the plane occupied by said friction facing; a driving armature rotatably mounted on said spindle adjacent said electromagnet; means normally forcing said armature facewise against the friction facing with a light pressure whereby a small air gap is left between the magnet and said armature; a driving member rotatably mounted on said spindle; means connecting said driving armature and driving member in driving relation but allowing said armature to move axially of said spindle when said magnet is energized to attract said armature and increase the pressure between the same and the friction facing and thereby applying the driving torque to said drum; a second annular electromagnet fixed to said spindle in coaxial relation therewith and located within the other end of said drum so that the effective face of its core is displaced by a slight amount axially of said spindle from the plane occupied by the friction facing on the other end of said drum; an annular braking armature mounted in coaxial relation with said spindle adjacent said second electromagnet; means for holding said braking armature against rotation but allowing it to move axially of said spindle so that it can be pulled toward the friction face on said drum when its electromagnet is energized; means normally moving said braking armature into physical contact with the friction facing on the other end of said drum with a nominal pressure to produce a constant braking action on said drum and in which position a small air gap remains between said armature and its electromagnet; and means for individually adjusting the air gaps between the driving and braking armatures and their corresponding magnets whether the device is in operation or not in operation.

4. A combined electromagnetic clutch and brake according to claim 3, in which the means for adjusting the air gaps between the two armatures and their magnets comprises means for moving the spindle and drum attached thereto axially relative to the first magnet whereby said driving armature, by virtue of its physical contact with the friction facing on said drum, is moved away from said magnet to increase the air gap between the same and its magnet, means normally tending to move said spindle and drum in the other direction relative to said first magnet; and means for moving said second magnet relative to said spindle and braking armature in a direction away from braking armature to increase the air gap between the two and against the action of means normally tending to move said magnet in an opposite direction.

5. A combined electromagnetic clutch and brake according to claim 3, in which the means for adjusting the air gaps between the two armatures and their magnets comprises a bushing between the first magnet on the support for preventing axial movement thereof; a resilient spacer between the ball bearing and said first magnet; adjusting means for moving the spindle and drum fixed thereto axially relative to said first magnet whereby said driving armature, by virtue of its physical contact with one end of said drum, is moved relative to said magnet to vary the air gap between the two; a spline connection between said second electromagnet and said spindle, a resilient spacer between the same and said ball bearing tending to move the magnet axially of the spindle toward said braking armature; and adjustable means for moving said second electromagnet along said spindle against the action of said resilient spacer to vary the air gap between the same and said braking armature.

6. A combined electromagnetic clutch and brake according to claim 3 and including means for manually rotating the drum while in a braked condition, said means including an adjusting knob operatively connected to said braking armature for rotating the same.

MILLER R. HUTCHISON, Jr.

References Cited in the file of this patent

UNITED STATES PATENTS

| Number | Name | Date |
|---|---|---|
| 906,841 | Whitcomb | Dec. 15, 1908 |
| 2,421,757 | Oetzel | June 10, 1947 |
| 2,481,028 | Lear | Sept. 6, 1949 |